United States Patent [19]

Wirth

[11] 4,310,866
[45] Jan. 12, 1982

[54] SHOOTTHROUGH FAULT PROTECTION SYSTEM FOR BIPOLAR TRANSISTORS IN A VOLTAGE SOURCE TRANSISTOR INVERTER

[75] Inventor: William F. Wirth, Ithaca, N.Y.

[73] Assignee: Borg-Warner Corporation, Chicago, Ill.

[21] Appl. No.: 79,855

[22] Filed: Sep. 28, 1979

[51] Int. Cl.³ .............................................. H02H 7/122
[52] U.S. Cl. ................................... 361/88; 361/111; 361/93; 361/58; 363/53; 363/132
[58] Field of Search .................. 361/91, 88, 110, 111, 361/100, 98, 93, 94, 58; 363/50, 52, 53, 57, 55, 56, 131, 132, 135, 136, 127, 128

[56] References Cited

U.S. PATENT DOCUMENTS 3,321,697 5/1967 Etter ..................................... 363/135
4,068,293 1/1978 Staruch et al. ................. 363/135 X
4,099,225 7/1978 Nygaard .............................. 363/56

FOREIGN PATENT DOCUMENTS 2632381 1/1978 Fed. Rep. of Germany ...... 363/132

*Primary Examiner*—Patrick R. Salce
*Attorney, Agent, or Firm*—James E. Tracy

[57] ABSTRACT

Faulted bipolar transistors in a voltage source transistor inverter are protected against shootthrough fault current, from the filter capacitor of the d-c voltage source which drives the inverter over the d-c bus, by interposing a small choke in series with the filter capacitor to limit the rate of rise of that fault current while at the same time causing the d-c bus voltage to instantly drop to essentially zero volts at the beginning of a shootthrough fault. In this way, the load lines of the faulted transistors are effectively shaped so that they do not enter the second breakdown area, thereby preventing second breakdown destruction of the transistors.

3 Claims, 2 Drawing Figures

SHOOTTHROUGH FAULT PROTECTION SYSTEM FOR BIPOLAR TRANSISTORS IN A VOLTAGE SOURCE TRANSISTOR INVERTER

BACKGROUND OF THE INVENTION

This invention relates to a protection system for preventing second breakdown destruction of bipolar transistors, in a voltage source transistor inverter, in the event of a shootthrough fault or an output short circuit.

In a typical voltage source transistor inverter at least two pairs of power bipolar transistors are series-connected across the d-c bus over which a d-c voltage is received from a d-c voltage source. The circuit junction of each pair of transistors connects to a load, such as an induction motor. By switching the transistors on and off (namely, between saturation and cutoff) in a predetermined sequence the d-c voltage is effectively converted to a-c voltage for application to the load. For example, when the inverter includes three pairs of bipolar transistors (which may be power darlingtons) the inverter output voltage will exhibit a six-step waveshape to approximate a sine wave.

Under normal conditions, a series-connected pair of transistors will never be turned on at the same time by the control circuitry for the inverter. Unfortunately, however, a transistor can be inadvertently switched on, such as by noise, when it should be non-conductive, and if the inadvertently triggered transistor becomes conductive at the same time that the other transistor in the pair has already been turned on by the control circuitry, essentially a short circuit will be created across the d-c bus through the emitter-collector conduction paths of the two faulted transistors. The shunt-connected filter capacitor of the d-c voltage source thereupon discharges and, in the absence of some protection arrangement, would destroy at least one of the two transistors within a few microseconds due to the transistor load line entering the area of second breakdown. This is commonly referred to as a "shootthrough fault."

To appreciate the magnitude of the fault current, in a 20 horsepower inverter drive, for example, the filter capacitor (which may actually comprise a series of separate parallel-connected capacitors) may typically have a capacitance of 13,200 microfarads and the d-c voltage on the d-c bus, and therefore across the filter capacitor, may be around 300 volts. If there is a shootthrough fault which short circuits the d-c bus, a peak fault current of up to 10,000 amperes could flow through the two conducting faulted transistors, the fault current being limited only by the filter capacitor's effective series resistance. Moreover, since the filter capacitor can deliver more current to the transistors than they can accept, the d-c bus voltage will remain at its normal high level (300 volts) at the beginning of a shootthrough fault. As a result, the full bus voltage will be across the emitter-collector conduction path of the inadvertently triggered transistor at a time when its collector current (namely, the fault current) is of very high amplitude. The transistor load line will therefore fall well within the second breakdown area and the very high peak power (the collector voltage $V_{ce}$ multiplied by the collector current $I_c$) will destroy the transistor.

To overcome this problem, shootthrough fault protection schemes have been developed. A well-known prior arrangement provides a crowbar circuit, consisting of an SCR, across the d-c bus. When a shootthrough fault occurs, the SCR is fired into conduction to divert the fault current from the transistors to the SCR which has considerably better surge characteristics. However, since the SCR has a higher voltage drop (greater than one volt) than the two series transistors (0.3 volt + 0.3 volt or 0.6 volt) some of the fault current still passes through the transistors and they are not completely protected. Also since the SCR must discharge the filter capacitor it has to have a large $I^2T$ rating.

The shootthrough fault protection system of the present invention constitutes a significant improvement over those previously developed, especially over the prior arrangement described hereinbefore, achieving much greater protection of the transistors and yet being considerably simpler and less expensive in construction.

SUMMARY OF THE INVENTION

The shootthrough fault protection system of the invention prevents bipolar transistors, in a voltage source transistor inverter, from suffering second breakdown damage from shootthrough fault current flowing through faulted transistors from the filter capacitor of the d-c voltage source which drives the inverter via a d-c bus. The system comprises protection means for effectively shaping the load lines of the faulted transistors, during a shootthrough fault, to avoid entering the second breakdown area, thereby preventing second breakdown destruction of the transistors. The protection means may be provided by a choke, inserted in series with the filter capacitor, which limits the rate of increase of any shootthrough fault current and causes the d-c voltage, across the d-c bus which connects the d-c voltage source to the inverter, to instantly drop to essentially zero volts in response to the initiation of a shootthrough fault. In this way, any significant voltage across the faulted transistors is effectively removed and the transistor load lines are kept well outside of the second breakdown area, the peak powers thereby being limited to levels insufficient to destroy the transistors.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing in which:

DESCRIPTION OF THE ILLUSTRATED EMBODIMENT

Figure 1:
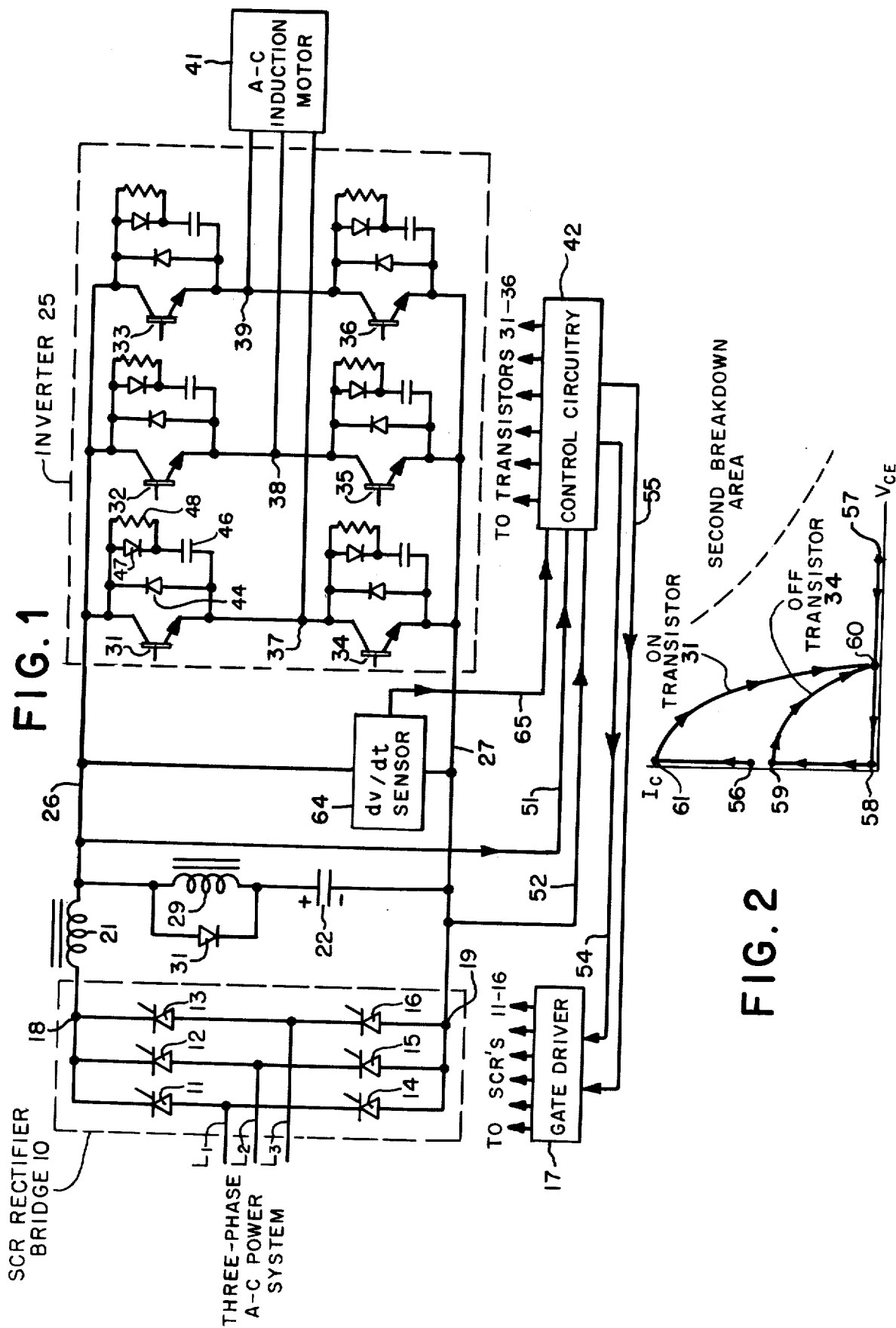
FIG. 1 schematically illustrates a shootthrough fault protection system, constructed in accordance with the invention, and the manner in which that system is coupled to a voltage source transistor inverter to effect protection thereof.

Line conductors $L_1$, $L_2$ and $L_3$ connect to a conventional three-phase a-c power system and thus provide three-phase a-c voltage, namely three alternating voltages that are phase-displaced with respect to each other by 120° and have a commutating frequency of 60 hertz. Each of the three phase voltages is a line-to-line voltage and appears on one of the line conductors $L_1$, $L_2$ and $L_3$ relative to another one of the line conductors. The amplitude of each phase voltage may take any appropriate value depending on the characteristics of the load to be energized. The a-c energy received over the line conductors is converted to d-c power by phase-controlled SCR rectifier bridge 10 which is of well-known construction. Specifically, the bridge has a family of six silicon controlled rectifiers or SCR's 11–16 which, when fired into conduction by gate current from gate driver 17, rectify the applied a-c voltage and develop across the bridge's positive and negative output terminals (designated 18 and 19, respectively) rectified voltage of a magnitude determined by the conduction angles of the SCR's during each half cycle of the applied a-c voltage.

To explain, each SCR in bridge 10 can conduct, during each positive polarity half cycle of the voltage applied thereto from the a-c power system, when the SCR's anode is positive relative to its cathode. However, conduction will not occur during a positive half cycle until gate current is supplied to the SCR's gate from gate driver 17. At that instant, the SCR fires into conduction, or turns on, and permits load current to flow therethrough until the end of the positive half cycle. The greater the phase angle or time delay between the start of a positive half cycle and the firing of the SCR into conduction, the less the conduction angle and the less alternating current that will be rectified and supplied to the load, thereby providing less rectified voltage across output terminals 18 and 19 of the SCR rectifier bridge. Of course, this rectified voltage will be of positive polarity at terminal 18 with respect to terminal 19.

Filter choke 21 and filter capacitor 22 filter the rectified voltage from the bridge to provide a filtered d-c voltage of a magnitude, for example, of 300 volts for application to inverter 25 over the d-c bus provided by lines 26 and 27. It will be assumed, by way of example, that inverter 25 provides a 20 horsepower drive, namely it is capable of driving a 20 horsepower load. By controlling the conduction angles of SCR's 11–16 the d-c voltage applied to inverter 25 is controlled. Hence, rectifier bridge 10, filter choke 21 and filter capacitor 22 constitute a controllable voltage source for the inverter. In a current source inverter, the current supplied to the inverter is controlled and no filter capacitor (similar to capacitor 22) is employed. As will be appreciated, capacitor 22 causes the shootthrough fault problem which is overcome with the present invention. For that reason, the invention is applicable to voltage source inverters.

The purpose of choke 29 and the parallel-connected diode 31, which is of the fast recovery type, will be explained later. Suffice it to say at this point that the choke is relatively small, preferably having an inductance of around 8 microhenries, and thus has a minimal effect on the filtering capability of the filter circuit 21, 22. In other words, no significant ripple component will be introduced into the d-c voltage on the d-c bus 26, 27 because of the presence of choke 29.

Inverter 25 has a well-known circuit configuration. It includes three pairs of NPN bipolar power transistors 31–36, each pair being series-connected across the d-c bus 26, 27. The circuit junctions 37, 38 and 39 of the three transistor pairs connect to the windings of a-c induction motor 41. By supplying drive current to the bases of the six bipolar transistors 31–36 at prescribed times, the d-c voltage across the d-c bus is effectively changed to a-c voltage as applied to the windings of the motor, thereby delivering alternating current to the windings. For example, if base drive current is simultaneously supplied to transistors 31 and 35 to drive those transistors into their saturation modes, current will flow from positive line 26 and through, in the order named, the emitter-collector conduction path of transistor 31, junction 37, a winding of motor 41, junction 38 and the emitter-collector conduction path of transistor 35 to negative line 27. If transistors 31 and 35 are then cutoff and transistors 32 and 34 are turned on instead, current will flow through the same motor winding in the opposite direction. Of course, control circuitry (shown in FIG. 1 by block 42) for switching the transistors 31–36 on and off in the correct sequence and at the correct times in order to provide a-c energy for rotating the motor is well understood by those skilled in the art.

Fast recovery diode 31, which shunts choke 29, clamps the d-c bus to the filter capacitor voltage, thereby preventing the bus from overshooting when the transistors in the inverter are switched on and off. Diode 31 also provides a discharge path for the inductive energy developed in choke 29.

The emitter-collector conduction path of each of the six power transistors 31–36 is shunted by an oppositely poled feedback diode (like diode 44 which shunts transistor 31) for circulating the motor reactive current back to filter capacitor 22. The six feedback diodes (like diode 44) are also effective to clamp the motor terminal voltage so that it will never exceed the d-c bus voltage.

Preferably, each of transistors 31–36 will also be shunted by a conventional snubber network to prevent the inductive energy in the load from damaging the transistor when it is switched off by circuitry 42 during normal operation. Since the six snubber networks are of identical construction only the network bridging transistor 31 will be described. As transistor 31 is being turned off by control circuitry 42 to remove the d-c bus voltage from a motor winding, the inductive energy or "kick" from that winding quickly charges capacitor 46 through diode 47. When the transistor is subsequently turned on by circuitry 42, capacitor 46 discharges slowly through resistor 48.

While each of power bipolar transistors 31–36 is illustrated in FIG. 1 as a conventional NPN transistor (to simplify the drawing), in reality it would preferably take the form of a well-known power darlington transistor. In the darlington arrangement, each of transistors 31–36 comprises a combination of two transistors, while still having only three connections, namely base, emitter and collector connections as is the case in FIG. 1.

Under the control of circuitry 42 programmed base drive current is supplied to transistors 31–36, as a result of which inverter 25 applies a-c voltage to motor 41 of a magnitude directly proportional to the amplitude of the d-c bus voltage. The frequency of the inverter output voltage is established by the frequency of the driving signals applied to the bases of transistors 31–36 from control circuitry 42. In well-known fashion, this frequency may be correlated with and determined by the d-c bus voltage by means of a voltage controlled oscillator, included in circuitry 42, which operates in response to the d-c bus voltage received over lines 51 and 52. The frequency of the oscillator is determined by the d-c bus voltage and varies directly therewith, thereby maintaining substantially constant the ratio of amplitude to frequency of the a-c voltage developed by inverter 25. The speed at which motor 41 will be rotated is determined by and is directly proportional to the inverter frequency. Although not shown, the shaft of motor 41 will drive some mechanical load. By maintaining a fixed ratio of the amplitude of the inverter output voltage relative to its frequency, motor 41 will have a constant torque output capability regardless of motor speed.

To adjust the motor speed, the operation of SCR's 11-16 may be controlled in well-known manner by control circuitry 42 and gate driver 17 to establish the d-c bus voltage at a selected desired amplitude level to regulate the current flow to inverter 25 and motor 41. For example, a reference voltage, representing the desired d-c bus voltage required to drive the motor at the selected speed, may be provided in circuitry 42 and this reference voltage is compared with the actual d-c bus voltage to produce an error signal, on lines 54 and 55, which varies as a function of the difference between the desired d-c magnitude (represented by the reference voltage) and the actual magnitude of the d-c bus voltage being fed to the inverter. In a fashion well understood in the art, gate driver 17 responds to that error signal to produce properly timed gate current pulses for application to the gates of SCR's 11-16 in order to control the conduction angles as required to establish the d-c bus voltage across lines 26 and 27 at the magnitude necessary to drive motor 41 at the selected speed. If the d-c magnitude tends to decrease, for example, from the required level (thereby tending to decrease the motor speed), the error signal changes and causes gate driver 17 to increase the conduction angles, thereby increasing the d-c bus voltage until the correct amplitude level is re-established. Assuming that a different speed is preferred, for example a lower speed, the reference voltage may be changed (such as by manually adjusting a potentiometer) so that the error signal will cause gate driver 17 to decrease the conduction angles of SCR's 11-16 sufficiently to lower the d-c bus voltage applied to the inverter down to the level necessary to drive motor 41 at the new desired lower speed.

Of course, while the motor speed may be changed by a manual adjustment, the reference voltage may be derived by sensing some parameter or characteristic of the system, in which the inverter drive of FIG. 1 is incorporated, in order to automatically control the motor speed in response to that sensed information.

It is also to be understood that there are many arrangements to control an inverter and its associated rectifier bridge to regulate the operation of some load and, as will be appreciated, the invention is applicable to all of those arrangements. Moreover, it will be recognized that the d-c power supply may operate in response to single-phase rather than three-phase a-c energy. In the single-phase environment, line conductor $L_3$ and SCR's 13 and 16 would be omitted. A d-c bus voltage of positive polarity will still be produced on line 26 with respect to line 27.

Turning now to the invention, shootthrough fault protection is achieved primarily by means of choke 29 which introduces an impedance between filter capacitor 22 and transistors 31-36 and which limits the rate of rise of current flowing out of the filter capacitor. This effectively shapes the load lines of the inverter transistors during a shootthrough fault to prevent the load lines from entering the area of second breakdown.

Figure 2:
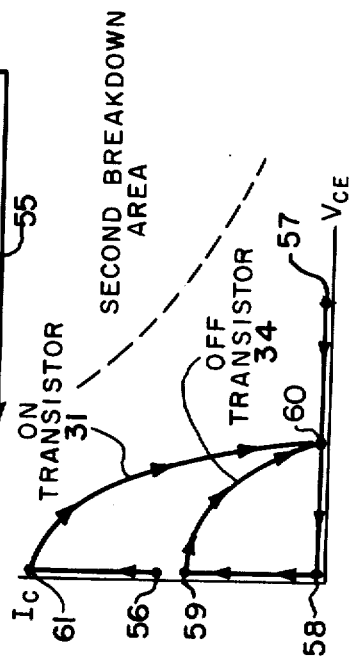
FIG. 2 depicts a pair of transistor load lines that will be helpful in understanding the operation of the fault protection system.

To explain, during normal operation none of transistors 31-36 will be turned on when its associated series-connected transistor is also conducting. However, if one of the transistors in a pair is inadvertently triggered into conduction (such as by noise or by heat) when the other transistor in the pair has already been turned on by control circuitry 42 under normal operation (or if both transistors in a pair are turned on simultaneously by noise or by some other cause) essentially a short circuit will exist across d-c bus 26, 27, creating a shootthrough fault condition since filter capacitor 22 will attempt to discharge through the short circuit. Assume, for example, that transistor 31 is on and carrying the load current to the motor when off transistor 34 is inadvertently turned on. They may both be referred to as "faulted transistors" even though transistor 31 has been turned on by control circuitry 42 in accordance with normal operation. To understand the operation of the invention, the load lines for on transistor 31 and off transistor 34 during a shootthrough fault are shown in FIG. 2. Immediately prior to the occurrence of the fault, transistor 31 will be at point 56 on its load line since it will be carrying high load current (and therefore high collector current $I_c$) and will be in its saturation mode, the collector voltage $V_{ce}$ (namely, the voltage drop through the emitter-collector conduction path) thereby being nearly zero volts. At that time, off transistor 34 will be established at point 57 on its load line, its collector current being zero while the full d-c bus voltage (300 volts) will be across the transistor.

At the instant the shootthrough fault occurs, the voltage across the d-c bus instantly drops to practically zero volts (due to the impedance presented by choke 29 and due to the virtually short circuit presented across the d-c bus by transistors 31 and 34) and the entire 300 volts on capacitor 22 appears across choke 29. In the absence of choke 29, the d-c bus would remain at 300 volts after the fault has been initiated since filter capacitor 22 can supply more discharge current through transistors 31 and 34 than the transistors can accept, the capacitor thereby holding the d-c bus at 300 volts despite being essentially shorted. On the other hand, with the insertion of choke 29 between filter capacitor 22 and the faulted transistors 31 and 34, an impedance (the inductive reactance of choke 29) is presented across the capacitor and the full capacitor voltage (300 volts) will appear across the choke, thereby instantly reducing the voltage across the d-c bus to nearly zero volts while at the same time preventing an instantaneous build up of the fault current, or collector current, passing through the faulted transistors. If the inductance of choke 29 is 8 microhenries, as previously suggested, then with the formula $E = L \, di/dt$ it is possible to determine the extent to which the fault current has been slowed down by the presence of choke 29. Specifically, with the preferred circuit parameters it is found that the time rate of change of the fault current flowing out of filter capacitor 22 will be 37 amperes per microsecond. Hence, by employing the small choke 29 the rate of increase or rise of the shootthrough fault current is limited considerably, causing the current to increase linearly along a ramp or slope function.

Without choke 29, the collector current in transistor 34 would therefore increase almost instantaneously to an extremely high amplitude and since the collector voltage will be held at the normal d-c bus voltage (300 volts) at that time, the load line would shoot substantially straight up (from point 57) well into the second breakdown area, resulting in second breakdown destruction of the transistor within a few microseconds.

In sharp contrast, with the present invention at the initiation of the shootthrough fault the collector voltage of transistor 34 instantly drops from the normal d-c bus voltage down to essentially zero volts. Hence, the load line for transistor 34 will proceed from point 57 and in the direction of the arrows to point 58. The collector current begins to build up at a relatively slow rate so the load line starts heading straight up along the $I_c$ axis from point 58. Meanwhile, dv/dt sensing device 64, which monitors the time rate of change of the d-c bus voltage, detects when that voltage suddenly drops to almost zero volts. In response to that voltage change, sensor 64 sends a control signal over line 65 to control circuitry 42 to remove the base drive from all of transistors 31–36, thereby turning off transistors 31 and 34. However, because of the charge storage characteristic of the transistors they cannot be turned off instantaneously. To elucidate, when a transistor is established in its saturation mode by base drive current (as is the case at points 57 and 58) minority carriers become stored in the base and collector regions and these carriers must be swept away, such as by recombination or absorption, after the base current is removed before the transistor switches out of its saturation mode and turns off. This process of sweeping out the minority carriers requires a finite time interval which is referred to as the "storage time."

From point 58 to point 59 on the load line for transistor 34, which will be during the transistor's storage time, the collector current will slowly rise in accordance with the ramp function until the transistor finally turns off at point 59. After transistor 34 is turned off, the load line proceeds from point 59 to point 60 (namely, one-half, or 150 volts, of the normal d-c bus voltage) and is shaped by the snubber network across the transistor in the same manner that the network shapes normal turn-offs.

When the fault current begins to flow through transistor 34 starting at point 58, the same current also passes through transistor 31. However, since the normal load current is already flowing through transistor 31 (point 56), the fault current will cause the load line for transistor 31 to proceed from point 56 to point 61, which occurs during the transistor's storage time, before the transistor eventually turns off. From point 61 to point 60 the load line for transistor 31 is shaped by its snubber network. When transistors 31 and 34 are both turned off, one-half of the bus voltage will be across each transistor.

It is thus apparent that choke 29 effectively shapes the load line of the faulted transistors 31 and 34, during a shootthrough fault, to avoid entering the second breakdown area, thereby preventing second breakdown destruction of the transistors. The emitter-collector voltage and the collector current of a faulted transistor are controlled so that they never produce a peak power of a magnitude which would destroy the transistor. In the presence of a shootthrough fault, choke 29 effectively keeps the faulted transistors in the power regions where they are rated.

It will be recognized that the invention is also useful in protecting the transistors in the event of an output short circuit, namely a short across the output of the inverter. Assume, for example, that circuit junctions or output terminals 37 and 38 are shorted together at a time when transistors 32 and 34 are turned on by control circuitry 42 during normal operation of the inverter. Under those conditions, transistors 32 and 34 would provide essentially a short circuit across the d-c bus and therefore would be faulted. Those transistors would be protected against damage, however, by the protection system of the invention which would operate in the same manner as described.

While a particular embodiment of the invention has been shown and described, modifications may be made, and it is intended in the appended claims to cover all such modifications as may fall within the true spirit and scope of the invention.

I claim:

1. A shootthrough fault protection system for a voltage source transistor inverter driven by a d-c bus voltage received over a d-c bus from a d-c voltage source having a shunt-connected filter capacitor, where the inverter includes, series-connected across the d-c bus, at least one pair of power bipolar transistors which are subject to undesired shootthrough fault current caused by the discharging of the filter capacitor through the emitter-collector conduction paths of the transistors whenever the transistors are inadvertently conductive at the same time thereby short-circuiting the d-c bus, said protection system comprising:

protection means, including a choke in series with the filter capacitor, for effectively shaping the load lines of the faulted transistors, during a shootthrough fault, to avoid entering the second breakdown area, thereby preventing second breakdown destruction of the transistors, said choke limiting the rate of increase of shootthrough fault current and causing the fault current to increases linearly along a ramp function and causing the d-c bus voltage, across the d-c bus, to instantly drop to essentially zero volts at the beginning of a shootthrough fault, thereby effectively removing any significant voltage across the faulted transistors and preventing the emitter-collector voltage and the collector current, in each faulted transistor, from producing a peak power of a magnitude which would destroy the transistor;

a fast recovery diode in shunt with said choke to clamp said d-c bus to the filter capacitor voltage and to provide a discharge path for the inductive energy developed in said choke; and means, responsive to a shootthrough fault, for removing the base drive from the faulted transistors to effect turn-off thereof.

2. A shootthrough fault protection system according to claim 1 wherein each of the faulted transistors is shunted by a snubber network which shapes the load line after the transistor has been turned off.

3. A fault protection system for preventing bipolar transistors, in a voltage source transistor inverter, from suffering second breakdown damage from fault current flowing through faulted transistors, when the output of the inverter is short circuited, from the filter capacitor of the d-c voltage source which drives the inverter over a d-c bus, the filter capacitor being connected across the d-c bus, comprising:

protection means, including a choke in series with the filter capacitor, for effectively shaping the load lines of the faulted transistors, when there is an output short circuit, to avoid entering the second breakdown area, thereby preventing second breakdown destruction of the transistors, said choke limiting the rate of increase of fault current and causing the fault current to increase linearly along a ramp function and causing the d-c bus voltage, across the d-c bus, to instantly drop to essentially zero volts at the beginning of an output short circuit, thereby effectively removing any significant voltage across the faulted transistors and preventing the emitter-collector voltage and the collector current, in each faulted transistor, from producing a peak power of a magnitude which would destroy the transistor;

a fast recovery diode in shunt with said choke to clamp said d-c bus to the filter capacitor voltage and to provide a discharge path for the inductive energy developed in said choke; and means, responsive to an output short circuit, for removing the base drive from the faulted transistors to effect turn-off thereof.

* * * * *